UNITED STATES PATENT OFFICE.

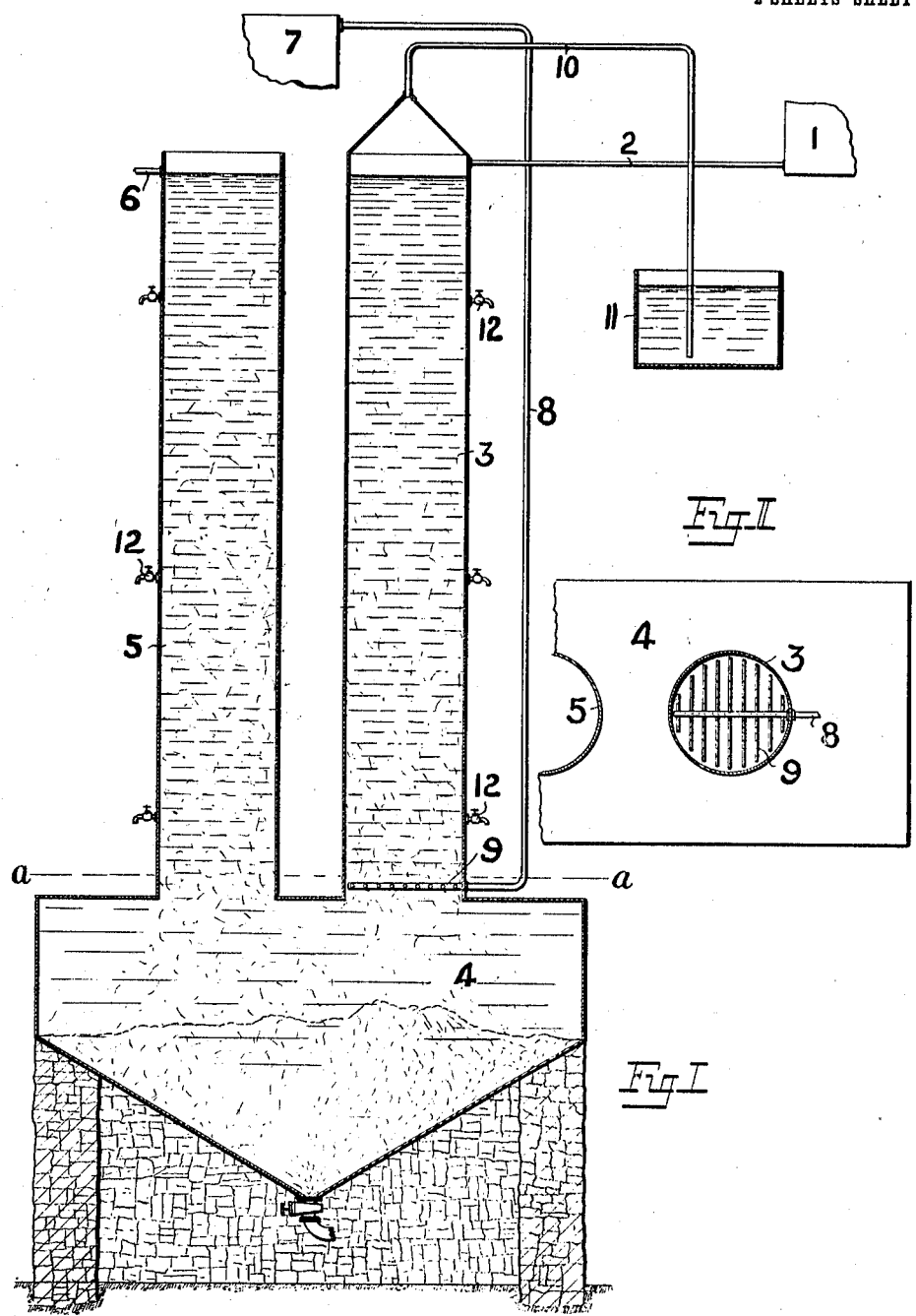

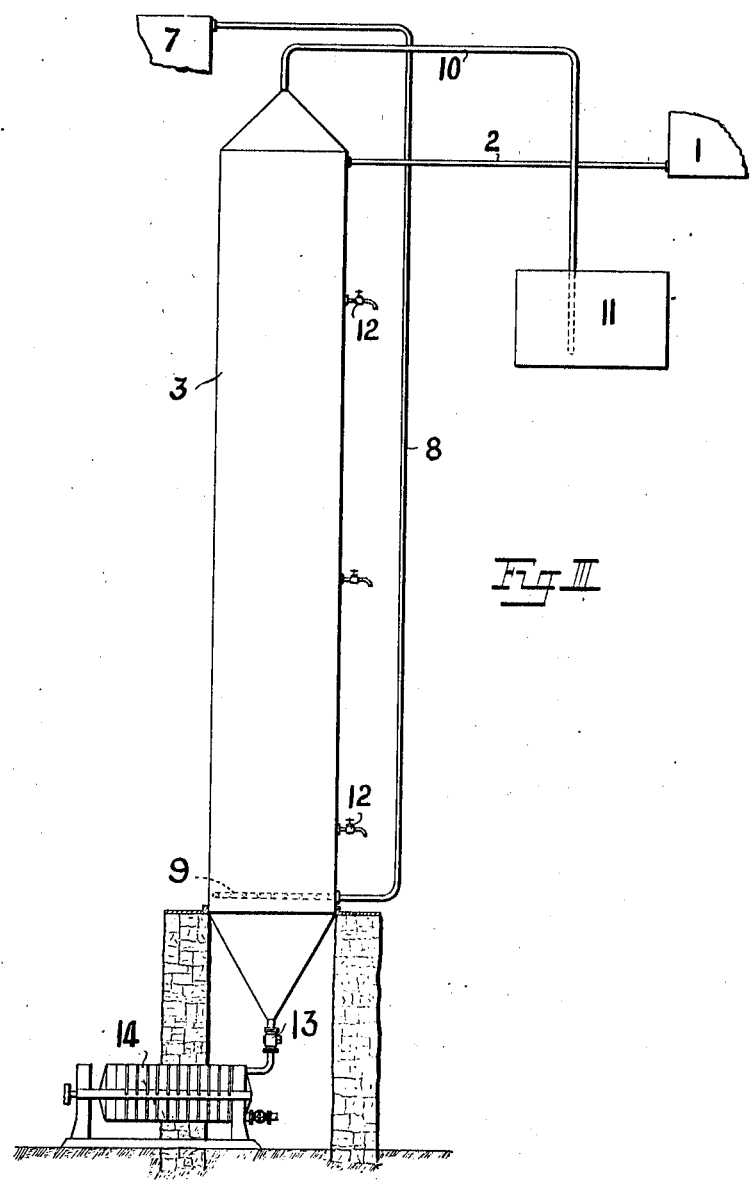

FRANK ONDRA, OF FERREIRA, JOHANNESBURG, TRANSVAAL.

APPARATUS FOR PRECIPITATION TREATMENT OF LIQUID.

1,003,781. Specification of Letters Patent. Patented Sept. 19, 1911.

Application filed April 29, 1911. Serial No. 624,073.

*To all whom it may concern:*

Be it known that I, FRANK ONDRA, electrician, an Austrian subject, residing at 22 Fox street, Ferreira, Johannesburg, Transvaal, have invented certain new and useful Improvements in Apparatus for Precipitation Treatment of Liquid, of which the following is a specification, reference being had therein to the accompanying drawing.

The present invention relates to apparatus for continuously treating liquid with a precipitant, separating the pricipitate and passing off the treated liquid. It is applicable to and will be described in connection with treatment of cyanid solution for the precipitation of zinc, copper and other metals therefrom and for the regeneration of the cyanid.

Apparatus in accordance with the invention is illustrated in vertical section in Fig. I of the accompanying drawings: Fig. II being a section on a—a Fig. I. Fig. III shows a modification.

1 is a source of cyanid solution, for instance working solution which has been passed through zinc precipitation boxes. Such solution is passed by pipe 2 into the top of a tower or closed vessel 3. The lower end of said tower or vessel opens into a relatively large receiver 4. A second tower or vessel 5 rises from the receiver and is provided with an outflow pipe 6 slightly below the inlet pipe 2, so that the two towers and the receiver form an inverted siphon through which the liquid flows under a low head downwardly through tower 3 and up again through tower 5.

7 is a source of supply of carbon dioxid under pressure, whence that gas is conveyed by pipe 8 to a series of perforated pipes 9 situated in the lower part of tower 3 and extending well over the cross sectional area thereof. The gas emerges from said perforated pipes and passes into the liquid to re-act therewith. According to circumstances, precipitants other than carbon dioxid may be used and if of a liquid nature they may be passed into the upper part of tower 3 instead at the bottom, as shown.

A pipe 10 is provided at the top of tower 3 to carry off the hydrogen cyanid (or other gas as the case may be). In the case of hydrogen cyanid it is passed into vessel 11 containing a reagent, e. g. sodium hydrate, with which it combines to form a soluble cyanid which may be returned to the working solution; and in the case of other valuable gas it is treated in any appropriate manner capable of utilizing it.

Cocks 12 are fittted at various heights in the walls of the towers for testing the condition of the liquid in them.

The capacity of tower 3 is such that it is traversed by the liquid substantially in the time taken to complete the precipitation aimed at. Thus, for treating strong (.25%) working cyanid solutions with carbon dioxid for the precipitation therefrom of zinc, copper and other metals or impurities, it has been found desirable for the liquid to occupy about an hour in passing from the top to the bottom of tower 3; while weaker solutions require correspondingly less time.

The receiver 4 and tower 5 are of such capacity that the liquid passes through them slowly enough to cause the deposition of the precipitate carried with it from tower 3, so that clear liquid only passes away from pipe 6. The precipitate ultimately settles in the bottom of the receiver 4 and is removed thence continuously, or from time to time, as desired. The receiver 4 and tower 5 constitute a convenient means for causing the liquid to flow slowly and regularly down through tower 3, and at the same time providing for efficient separation of the precipitate from the effluent liquid. On the other hand, any other suitable means for effecting these objects may be employed; for instance as shown in Fig. III, the bottom of tower 3 may be closed and provided with a valve 13 by which the flow of liquid down through the tower is controlled. In such case the separation may take place in a filter-press 14, in a settling tank, or otherwise.

What I claim and desire to secure by Letters Patent is:—

1. The combination of two vessels connected at the bottom, means for passing liquid into the upper part of one vessel and out of the upper part of the second vessel, a source of supply of precipitant fluid, and means for passing the same into the first named vessel.

2. The combination of two vessels, a common receiver into which said vessels open at the bottom, means for passing liquid into the upper part of one vessel and out of the upper part of the second vessel, a source of supply of precipitant fluid, and means for passing the same into the first named vessel.

3. The combination with a vessel, of means for passing liquid into the upper part of the same, a source of supply of precipitant gas under pressure, means for distributing said gas into the lower part of the vessel, and means for controlling the outflow of liquid from the bottom of the vessel and for separating the precipitate therefrom.

4. The combination with a vessel, of means for passing liquid into the upper part of the same, a source of supply of precipitant fluid, means for passing the same into the vessel, means controlling the outflow of liquid from the bottom of the vessel and for separating the precipitate therefrom, and means for withdrawing gas from the top of the vessel.

5. The combination with a vessel, of a source of supply of cyanid solution, means for passing said solution into the upper part of the vessel, a source of supply of precipitant fluid, means for passing the same into the vessel, and means for controlling the outflow of liquid from the bottom of the vessel and for separating the precipitate therefrom.

6. The combination with a vessel, of a source of supply of cyanid solution, means for passing said solution into the upper part of the vessel, a source of supply of precipitant fluid, means for passing the same into the vessel, means for controlling the outflow of liquid from the bottom of the vessel and for separating the precipitate therefrom, a liquid container, and a pipe passing from the top of the vessel into the liquid container.

7. The combination of two vessels, a common receiver into which said vessels open at the bottom, means for passing liquid continuously into the upper part of one vessel and out from the upper part of the second vessel, a source of supply of precipitant fluid, means for passing the same continuously into the first named vessel, said first named vessel being of such capacity that the required precipitation is effected while the liquid is passing through it, and the second vessel and the receiver being of such capacity as to permit the settlement of the precipitate so produced.

In testimony whereof I affix my signature in presence of two witnesses.

FRANK ONDRA.

Witnesses:
J. W. VEMUNG,
WESLEY E. JOHN.

---

Copies of this patent may be obtained for five cents each, by addressing the "Commissioner of Patents, Washington, D. C."